Patented Oct. 9, 1934

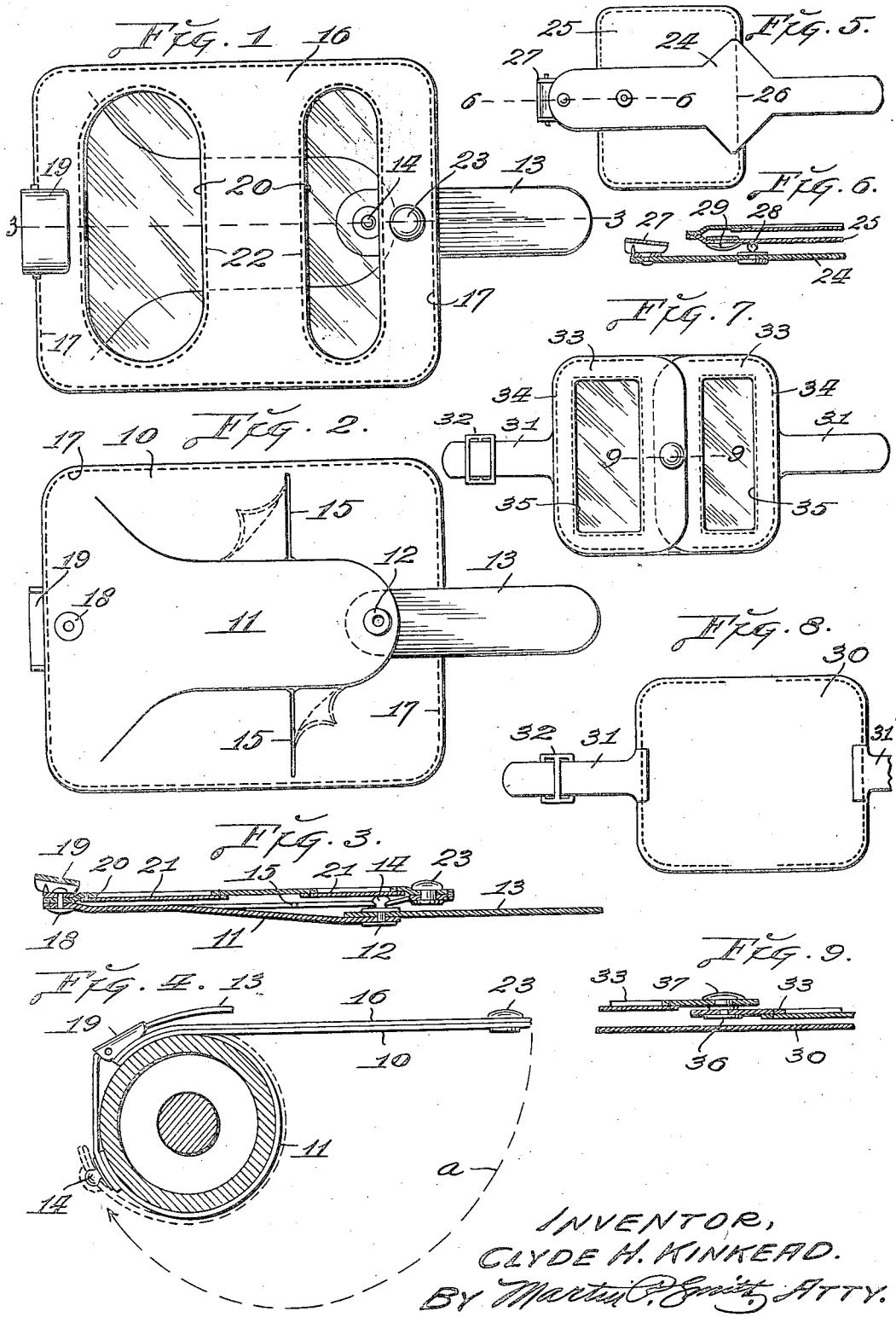

1,976,261

UNITED STATES PATENT OFFICE 1,976,261

CERTIFICATE HOLDER

Clyde H. Kinkead, Inglewood, Calif.

Application June 12, 1933, Serial No. 675,424

8 Claims. (Cl. 40—10)

My invention relates to holders for automobile drivers' licenses and registration cards and has for its principal objects, to generally improve upon and simplify the construction of the existing forms of drivers' licenses and automobile registration cards, to provide a holder that is relatively simple in construction, inexpensive of manufacture and which may be conveniently applied to the steering post or some other fixed part of the automobile in order that the license or registration cards may be conveniently observed and inspected as is required by many State laws and city ordinances and further, to provide a holder of the character referred to that is constructed of flexible waterproof material having a transparent front wall or panel through which the matter written and printed on the license or registration card may be readily observed and at the same time the card or license being fully protected against dirt or moisture when properly positioned within the pocket in the holder and the latter is positioned on a steering post or the like.

A further object of my invention is, to construct the holder with means forming a part of or secured to the back thereof for conveniently securing the body of the holder to a steering column or the like so that the registration cards or certificates may be readily inserted within or removed from the pocket in the body of the holder without necessitating the removal of the entire holder from the post or other part to which it is applied.

Further objects of my invention are, to construct the holder attaching means on the back of the holder so that it will conveniently conform to the shape of the steering post or another fixed member to which it is applied, further to make the holder attaching means adjustable so that it may be readily applied to supporting members of different sizes and further, to provide simple and efficient means whereby the main body of the holder which receives the driver's license or certificate, is provided with means whereby it may be readily attached to or detached from the parts that secure the holder to the post or other fixed member without necessitating the removal of the entire holder from the post or other support.

With the foregoing and other objects in view, my invention consists in certain novel features of construction and arrangements of parts that will be hereinafter more fully described and claimed and illustrated in the accompanying drawing in which:

Fig. 1 is a front elevational view of a certificate holder constructed in accordance with my invention.

Fig. 2 is a rear elevational view of the holder.

Fig. 3 is a longitudinal section taken on the line 3—3 of Fig. 1.

Fig. 4 is a cross sectional view of an automobile steering post and showing my improved holder applied thereto and with that portion of the holder that receives the license card or certificate disconnected from the attaching means in order to permit the insertion or removal of the cards or certificate.

Fig. 5 is a rear elevational view of a modified form of the holder.

Fig. 6 is a detail section taken on the line 6—6 of Fig. 5.

Fig. 7 is a front elevational view of a further modified form of the holder.

Fig. 8 is a rear elevational view of the form of holder illustrated in Fig. 7.

Fig. 9 is an enlarged detail section taken on the line 9—9 of Fig. 7.

Referring by numerals to the accompanying drawing and particularly to the form of holder illustrated in Figs. 1 to 4 inclusive, 10 designates a substantially rectangular sheet of thin flexible material such as leather, rubberized fabric or composition and cut from the central portion of this sheet 10, is a longitudinally disposed tongue-shaped section 11, the free end of which terminates adjacent to one end of said section 10.

Secured to the free end of the tongue 11 by means of a rivet 12, is a short strap 13 of flexible material that extends a short distance beyond the corresponding end of back member 10.

Carried by rivet 12 and projecting through the opening formed by the cutting of tongue 11 from the sheet 10, is a stud 14.

The sheet or back member 10 is provided intermediate its ends with slots 15 that extend from the edges of the tongue 11 toward the sides of member 10 and the corners of the material to the sides of the slots may be flexed upwardly as shown by dotted lines in Fig. 2 in order to permit the insertion and removal of the registration cards or certificates.

A front wall 16 of thin flexible material such as leather and of the same size and shape as the back wall 10, is positioned on top of said back wall and the edges of the two walls are permanently secured to each other in any suitable manner, preferably by a row or rows of stitching such as 17. By constructing the container of two separately formed pieces of material and uniting all four edges of said pieces by a row or rows of stitching, a substantially rectangular pocket is formed between the pieces of material for the reception of the enclosed card or certificate and the latter when inserted in the container is thoroughly protected and the ingress of dust, moisture and the like into the container between the edges of the sections of material is prevented.

Secured in any suitable manner to the ends of the front and rear walls of the holder, preferably by means of a rivet 18 and adjacent to the end of tongue 11 that is secured to rear wall 10, is a buckle 19 that occupies a position on top of front wall 16. This buckle is adapted to receive and secure the free end of strap 13 when the holder is positioned upon the steering post or the like.

Formed in front wall 16, are one or more openings such as 20 and positioned against the underside of the front wall and closing these openings are sections 21 of thin flexible transparent material such as celluloid.

The edges of these sections of transparent material are secured to the front wall 16 adjacent to the edges of the openings 20 therein by rows of stitching 22.

The construction just described provides one or more windows in the front wall 16 which permits data written and printed on the enclosed cards or certificates to be readily observed when the device is positioned upon a steering column or the like.

Secured to the front and rear walls of the holder adjacent to the end opposite the end to which buckle 19 is secured, is the socket member 23 of a conventional snap fastener and which socket member is adapted to receive stud 14 when the holder is positioned upon a steering column or the like.

In the practical use of the form of holder just described, the free end of tongue 11 may be lifted and the corners of the rear wall adjacent to the slots 15 may be flexed upwardly to permit the license cards or certificates to be inserted between the front and rear walls when properly inserted portions of the cards or certificates are readily visible through the windows in the front wall of the holder.

The attaching member comprising tongue 11 and strap 13 is now bent around a steering column or the like and the free end of strap 13 is secured to one end of the holder by means of buckle 19.

The body of the holder comprising the front and rear walls is now bent around the steering column as illustrated by dotted line $a$ Fig. 4, and the socket 23 is engaged on stud 14 so as to secure the body of the holder in position around the steering column.

Whenever desired, the socket 23 may be disengaged from stud 14 and thus the body of the holder comprising the front and rear walls may be shifted into the position shown by solid lines in Fig. 4 to permit the insertion or removal of the license cards or certificates without removing the entire holder from the steering column or other support.

When the license cards or certificates are properly positioned within the holder and the free end thereof is detachably secured to the stud 14, said license cards and certificates are conveniently held within the holder and are protected against dirt and moisture and at the same time portions of the faces of said cards or certificates are readily visible through the windows in the front wall of the holder.

In the modified construction illustrated in Figs. 5 and 6, a strap 24 is positioned on the rear side of the certificate holder 25, the latter comprising front and rear walls having their edges united, preferably by stitching and one of said walls having a slot for the insertion and removal of a card or certificate and said strap is secured to one edge of the body of said holder by a row or rows of stitching 26.

Carried by the free end of the strap that extends across the body of the holder, is a buckle 27 that receives the opposite free end of the strap when the latter is bent around a steering column or the like.

Carried by that portion of the strap that extends against the back of the holder, is the stud member 28 of a conventional snap fastener and secured to the rear wall of the body of the holder 25, adjacent to the edge opposite the edge to which strap 24 is connected, is the socket 29 of a snap fastener which receives stud 28 when the body of the holder is secured to strap 24.

In the modified construction illustrated in Figs. 7, 8 and 9, the body of the holder comprises a rear wall 30 of thin flexible material such as leather and the same is devoid of slots or openings.

Secured to and projecting outwardly from the ends of this rear wall are straps 31, one of which carries a buckle 32 that is adapted to receive the free end of the other strap when the holder is wrapped around a steering column or the like.

The front wall of this form of holder is composed of two sheets 33 of thin flexible material arranged so that their inner edges overlap each other as illustrated in Fig. 7 and the outer end edges and the side edges of these two sheets are secured to the corresponding edges of the rear wall 30 by rows of stitching 34.

Each front wall member 33 is provided with an opening 35 closed by a sheet of thin flexible transparent material, thereby forming a window in each front wall member.

Carried by the edge portion of the front wall member 33 that underlies the free inner edge of the other member, is a rivet 36 that carries a stud and which latter is engaged by a socket 37 that is carried by the free edge of the front wall member that overlies the free edge of the other member.

In this construction the holder is secured to a steering column or the like by means of straps 31 and buckle 32 and by disengaging socket 37 from the stud carried by rivet 36 the free overlapping edges of the front wall members 33 may be flexed upwardly or outwardly so as to permit the insertion or removal of license cards or certificates.

Thus it will be seen that I have provided a certificate holder that is relatively simple in construction, inexpensive of manufacture and very effective in performing the functions for which it is intended.

An especially desirable feature of my improved holder is the construction that will enable the license cards or certificates to be inserted within or removed from the main body of the holder without necessitating the removal of the entire holder from the steering column or other part upon which it is located.

It will be understood that minor changes in the size, form and construction of the various parts of my improved certificate holder may be made and substituted for those herein shown and described without departing from the spirit of the invention, the scope of which is set forth in the appended claims.

I claim as my invention:

1. A certificate holder, comprising a main body member composed of separately formed front and rear walls, the marginal edges of which walls are secured to each other to form a pocket closed on all sides, a strap secured at one end to the rear wall of the body of the holder adjacent one end thereof, which strap extends longitudinally across the back of the holder to a point beyond the end thereof opposite the end to which said strap is connected, means for securing said strap around a steering column or the like and means for detachably securing the end of the body of the holder opposite the end to which said strap is connected, to the intermediate portion of said strap.

2. A certificate holder, comprising a main body member composed of separately formed front and rear walls, the marginal edges of which walls are secured to each other to form a pocket closed on all sides, a strap secured at one end to the rear wall of the body of the holder adjacent one end thereof, which strap extends longitudinally across the back of the holder to a point beyond the end thereof opposite the end to which said strap is connected, means for securing said strap around a steering column or the like, means for detachably securing the end of the body of the holder opposite the end to which said strap is connected, to the intermediate portion of said strap and one of the walls of the body of the holder being provided with a slot for the insertion and removal of a certificate.

3. A certificate holder, comprising a main body member composed of separately formed front and rear walls, the marginal edges of which walls are secured to each other to form a pocket closed on all sides, a strap secured at one end to the rear wall of the body of the holder adjacent one end thereof, which strap extends longitudinally across the back of the holder to a point beyond the end thereof opposite the end to which said strap is connected, means for securing said strap around a steering column or the like, means for detachably securing the end of the body of the holder opposite the end to which said strap is connected, to the intermediate portion of said strap, one of the walls of the body of the holder being provided with a slot for the insertion and removal of a certificate and the other wall of the body member having a window whereby the inserted card or certificate may be readily observed.

4. A certificate holder, comprising separately formed front and rear walls, the marginal edges of which are secured to each other to form a pocket closed on all sides for the reception of a card or certificate, the rear wall of the holder having a transversely arranged opening for the insertion or removal of a card or certificate, a strap secured to the rear wall of the holder adjacent one end thereof and extending lengthwise of said holder to a point beyond the end opposite the end to which said strap is secured, means for securing said strap around a steering column or the like and means for detachably securing the end of the body opposite the end to which the strap is connected, to the intermediate portion of said strap.

5. A certificate holder, comprising separately formed front and rear walls, the marginal edges of which are secured to each other to form a pocket closed on all sides for the reception of a card or certificate, the rear wall of the holder having a transversely arranged opening for the insertion or removal of a card or certificate, a strap secured to the rear wall of the holder adjacent one end thereof and extending lengthwise of said holder to a point beyond the end opposite the end to which said strap is secured, means for securing said strap around a steering column or the like, means for detachably securing the end of the body opposite the end to which the strap is connected, to the intermediate portion of said strap and a window formed in the front wall of the holder for inspection of the enclosed card or certificate.

6. In a certificate holder, separately formed front and rear walls having their marginal edges secured to each other to form a pocket closed on all sides for the reception of a card or certificate, a strap secured to the rear wall of said holder adjacent one end thereof and extending lengthwise across the back of said holder to a point beyond the end thereof opposite the end to which said strap is secured, the length of which strap is such as to encircle a steering column or the like and readily releasable means for securing the other end of said pocket to the intermediate portion of said strap when the latter is positioned around a steering column or the like.

7. In a certificate holder, separately formed front and rear walls having their marginal edges secured to each other to form a pocket closed on all sides for the reception of a card or certificate, a strap secured to the rear wall of said holder adjacent one end thereof and extending lengthwise across the back of said holder to a point beyond the end thereof opposite the end to which said strap is secured, the length of which strap is such as to encircle a steering column or the like and readily releasable means for detachably connecting the end portion of the body of the holder opposite the end to which said strap is connected, to the intermediate portion of said strap.

8. In a certificate holder, a strap adapted to encircle a steering column or the like, a double walled flexible certificate holder having one end secured to one end of said strap so that the body of the holder overlies the greater portion of said strap, the length of which strap is such that its free end projects a substantial distance beyond the edge of the holder opposite the edge to which said strap is attached and means for detachably connecting the end of the body of the holder opposite the end that is connected to said strap, to the intermediate portion of said strap when the holder and strap are applied to a steering column or the like.

CLYDE H. KINKEAD.